US010602663B2

(12) United States Patent
Szabo

(10) Patent No.: US 10,602,663 B2
(45) Date of Patent: Mar. 31, 2020

(54) AQUATIC VEGETATION HARVESTING SYSTEM

(71) Applicant: Nicholas James Szabo, Clearwater, FL (US)

(72) Inventor: Nicholas James Szabo, Clearwater, FL (US)

( * ) Notice: Subject to any disclaimer, the term of this patent is extended or adjusted under 35 U.S.C. 154(b) by 123 days.

(21) Appl. No.: 15/709,406

(22) Filed: Sep. 19, 2017

(65) Prior Publication Data

US 2018/0098497 A1 Apr. 12, 2018

Related U.S. Application Data

(60) Provisional application No. 62/396,771, filed on Sep. 19, 2016, provisional application No. 62/447,868, filed on Jan. 18, 2017, provisional application No. 62/447,890, filed on Jan. 18, 2017.

(51) Int. Cl.
| | |
|---|---|
| *A01D 44/00* | (2006.01) |
| *B63B 35/00* | (2020.01) |
| *A01M 21/02* | (2006.01) |
| *B63B 38/00* | (2006.01) |

(52) U.S. Cl.
CPC .............. *A01D 44/00* (2013.01); *A01M 21/02* (2013.01); *B63B 35/00* (2013.01); *B63B 38/00* (2013.01)

(58) Field of Classification Search
CPC ........ A01D 44/00; A01M 21/02; B63B 35/00; B63B 38/00
USPC .......................................................... 56/8, 9
See application file for complete search history.

(56) References Cited

U.S. PATENT DOCUMENTS

| | | | | |
|---|---|---|---|---|
| 3,546,858 | A * | 12/1970 | Chaplin | A01D 44/00 56/9 |
| 3,626,675 | A * | 12/1971 | Chaplin | A01D 44/00 56/299 |
| 3,750,723 | A * | 8/1973 | Schirtzinger | B63B 22/023 141/388 |
| 3,866,396 | A * | 2/1975 | Meyer | A01D 44/00 56/9 |
| 4,258,534 | A * | 3/1981 | Bryant | A01D 44/00 56/9 |
| 4,764,137 | A * | 8/1988 | Schulte | E02F 7/10 138/104 |
| 6,023,920 | A | 2/2000 | Penny et al. | |
| 6,116,004 | A | 9/2000 | Penny et al. | |
| 6,250,054 | B1 | 6/2001 | Kramer | |
| 6,357,213 | B1 * | 3/2002 | Dillingham | A01D 44/00 56/8 |
| 6,393,812 | B1 | 5/2002 | Stewart, III et al. | |
| 6,449,931 | B1 | 9/2002 | Penny et al. | |
| 6,672,039 | B1 | 1/2004 | Shonnard | |
| 6,725,637 | B2 | 4/2004 | Snider et al. | |
| 6,732,499 | B2 | 5/2004 | Morgan et al. | |
| 6,832,465 | B2 | 12/2004 | Horvath et al. | |
| 6,865,869 | B2 | 3/2005 | Penny | |
| 6,910,319 | B2 | 6/2005 | Castleberry | |
| 7,036,295 | B1 | 5/2006 | Vaughan | |
| 7,958,705 | B1 * | 6/2011 | Bourque | A01D 44/00 56/8 |
| 8,359,819 | B1 | 1/2013 | Timm | |

(Continued)

*Primary Examiner* — Robert E Pezzuto
(74) *Attorney, Agent, or Firm* — Kowert, Hood, Munyon, Ranking & Goetzel, P.C.; Mark R. DeLuca

(57) ABSTRACT

Described herein is an apparatus and system for economically and efficiently harvesting and controlling the growth of aquatic vegetation.

11 Claims, 16 Drawing Sheets

(56) References Cited

U.S. PATENT DOCUMENTS

| | | | |
|---|---|---|---|
| 8,381,500 B2 | 2/2013 | Grimes | |
| 8,479,481 B2 | 7/2013 | O'Toole et al. | |
| 8,734,195 B2 * | 5/2014 | Coombs | B63B 27/34 441/5 |
| 8,826,634 B2 | 9/2014 | Landry, Jr. | |
| 9,060,464 B2 | 6/2015 | Horton et al. | |
| 9,493,215 B2 | 11/2016 | Horton et al. | |
| 10,051,788 B2 * | 8/2018 | Jirik | A01D 44/00 |
| 2002/0112460 A1 * | 8/2002 | Penny | A01D 44/00 56/8 |

* cited by examiner

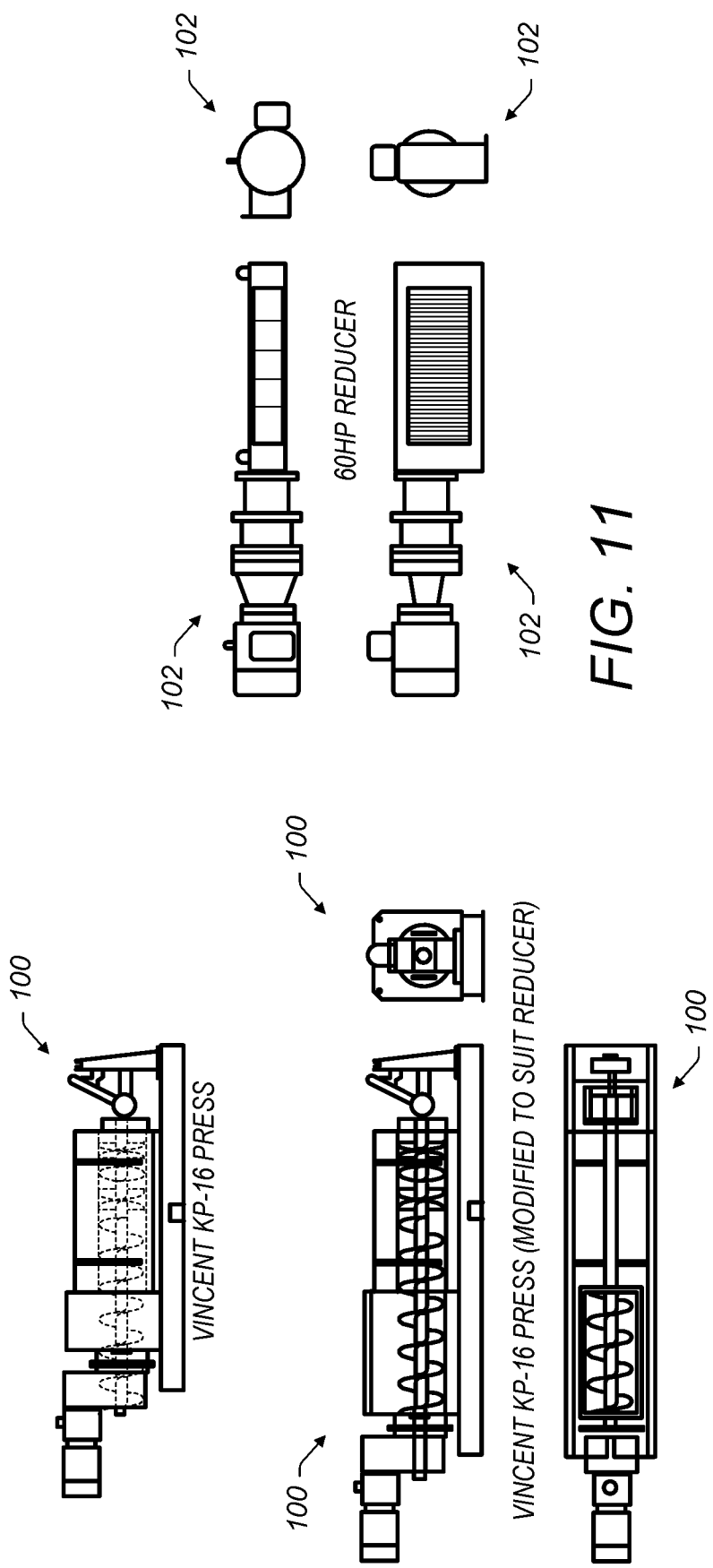

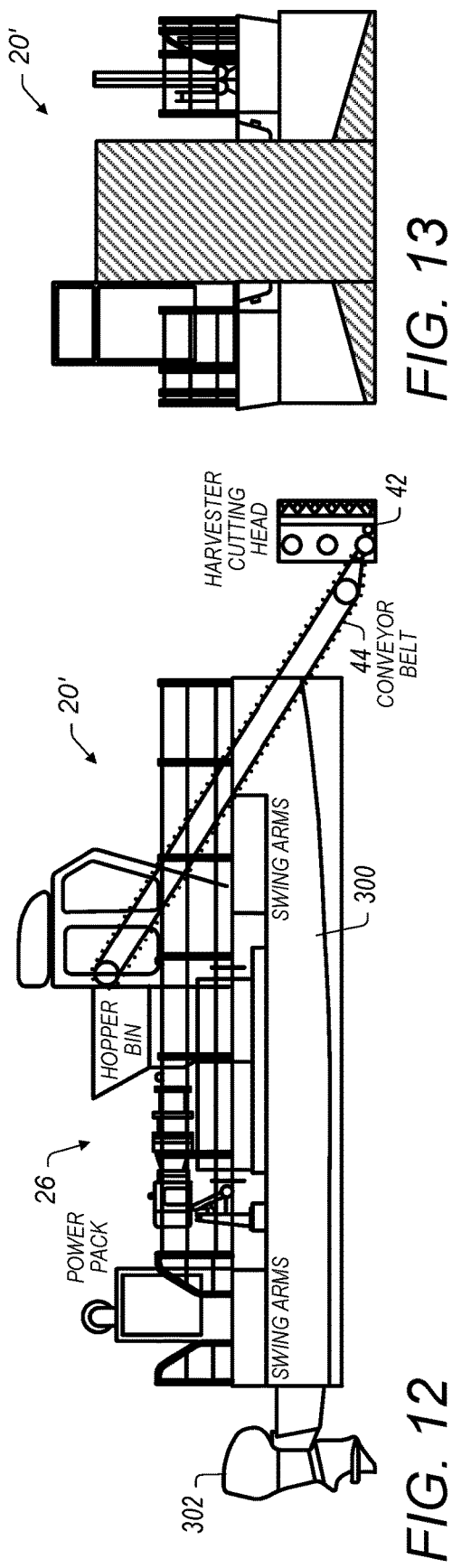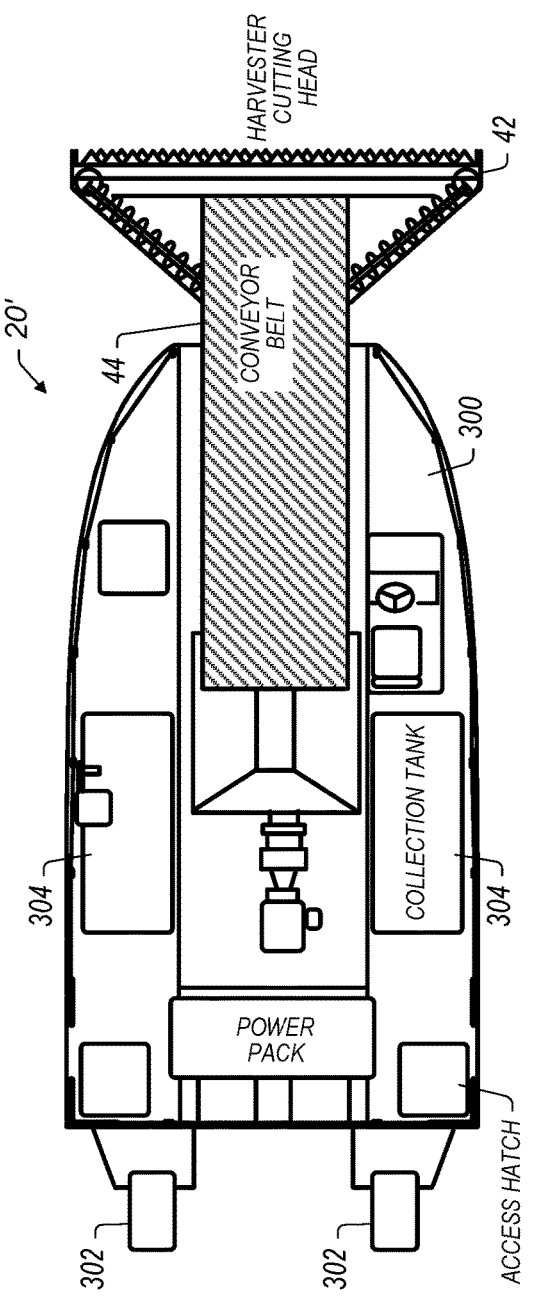

AQUATIC VEGETATION HARVESTING SYSTEM

PRIORITY CLAIM

This application claims priority to U.S. Provisional Application Ser. No. 62/396,771 entitled "AQUATIC VEGETATION HARVESTING SYSTEM" filed Sep. 19, 2016; U.S. Provisional Application Ser. No. 62/447,868 entitled "ARTICULATED VEGETATION HARVESTING SYSTEM" filed Jan. 18, 2017; and U.S. Provisional Application Ser. No. 62/447,890 entitled "FLOATING WATERCRAFT VEGETATION HARVESTING SYSTEM" filed Jan. 18, 2017, which are incorporated herein by reference in its entirety.

BACKGROUND OF THE INVENTION

1. Field of the Invention

The present invention relates to an apparatus and system for economically and efficiently harvesting and controlling the growth of aquatic vegetation such as weeds and the like.

2. Description of the Relevant Art

Controlling and harvesting aquatic vegetation such as weeds and the like should be a large and growing industry. However, due to lack of properly designed equipment, the industry is stagnant, if not contracting.

This represents a massive and continuing problem for both State and Federal agencies responsible for the management of the Waterways and "Wetlands" throughout the USA and the rest of the world as well. Human sewage discharges, fertilizer washing off the farmlands and residential/commercial properties has promoted the growth of aquatic vegetation to where it is:

a. Depleting the oxygen from the water and killing off marine life, thereby decimating recreational areas across America, causing massive economic losses in the billions annually.
  b. Choking the navigational waterways to where boats cannot operate there, due to the weeds clogging their props, further destroying both America's recreational areas and highly cost-effective transportation waterways.

The Wetlands across America are a "natural filtration system" used by nature to remove pollutions from water. Again, due to the increase of "man induced" fertilizer to the waterways, the plant growth in places like the Florida Everglades have become clogged and ineffective, thereby greatly reducing to eliminating its ability to filter the water prior to going back into the aquifer and becoming the drinking water for all surrounding metropolitan cities.

To date, systems for performing these tasks have had limited success. For example, U.S. Patent Application Publication No. 2002/0112460 to Penny, the disclosure of which is hereby incorporated by reference, discloses a tracked amphibious vehicle with a weed shredder attached thereto. The vehicle is driven along a shallow, weedy area while the shredder mows the weeds, thereby leaving the shredded vegetation in the water. This nitrogen and phosphorus rich vegetation promotes the future re-growth of weeds and is referred to by Water Management agencies as "Source Point Pollution".

An alternative solution to mechanical harvesting is spraying the weeds with a poisonous herbicide. But this too is problematic, as most of these weeds live in the drinking water of the local population.

There is mechanical equipment that "harvests" the aquatic weeds, similar to a Combine used on a farm, but they are not cost effective at all, therefore way too expensive for Water Management Agencies to use. Furthermore, they can only operate in deep waters, leaving both shallow water and the Wetlands unmanaged. This leaves the Agencies with the "cost effective" but deadly-to-humans solution, poisonous herbicides.

SUMMARY OF THE INVENTION

Thus, despite the improvements of the known aquatic harvesters, there remains a need for a cost effective harvesting system that:

a. operates equally well in shallow and deep water while quickly and economically harvesting the vegetation; and/or,
  b. quickly and economically transports the harvested vegetation to shore, removing from the water system the plants and their nitrogen and phosphorus values contained therein, thereby eliminating Source Point Pollution.

The present invention disclosed herein fulfills these and other needs.

BRIEF DESCRIPTION OF THE DRAWINGS

Advantages of the present invention will become apparent to those skilled in the art with the benefit of the following detailed description of embodiments and upon reference to the accompanying drawings in which:

FIG. 10 is a side, top, front and bottom view showing a possible press configuration;

FIG. 11 is a side, top, front, back and bottom view showing a possible reducer configuration;

FIG. 12 is a side schematic view of an alternative possible vegetation harvesting system having harvesting equipment mounted to a floating watercraft such as a boat in accordance with an embodiment of the invention;

FIG. 13 is a front view of the alternative possible vegetation harvesting system of FIG. 7; and FIG. 14 is a top view of the alternative possible vegetation harvesting system of FIG. 7;

Figure 1:
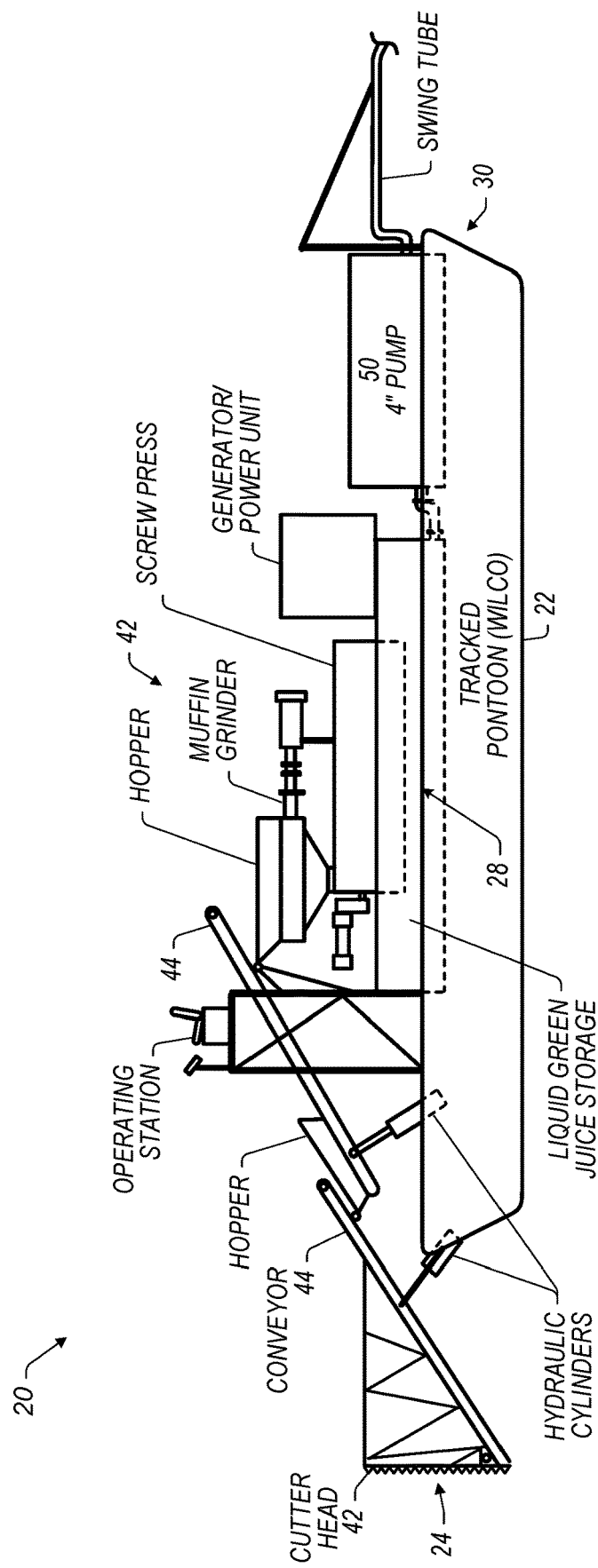
FIG. 1 is a schematic side diagram of an aquatic vegetation harvesting system in accordance with an embodiment of the present invention.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Figure 2:
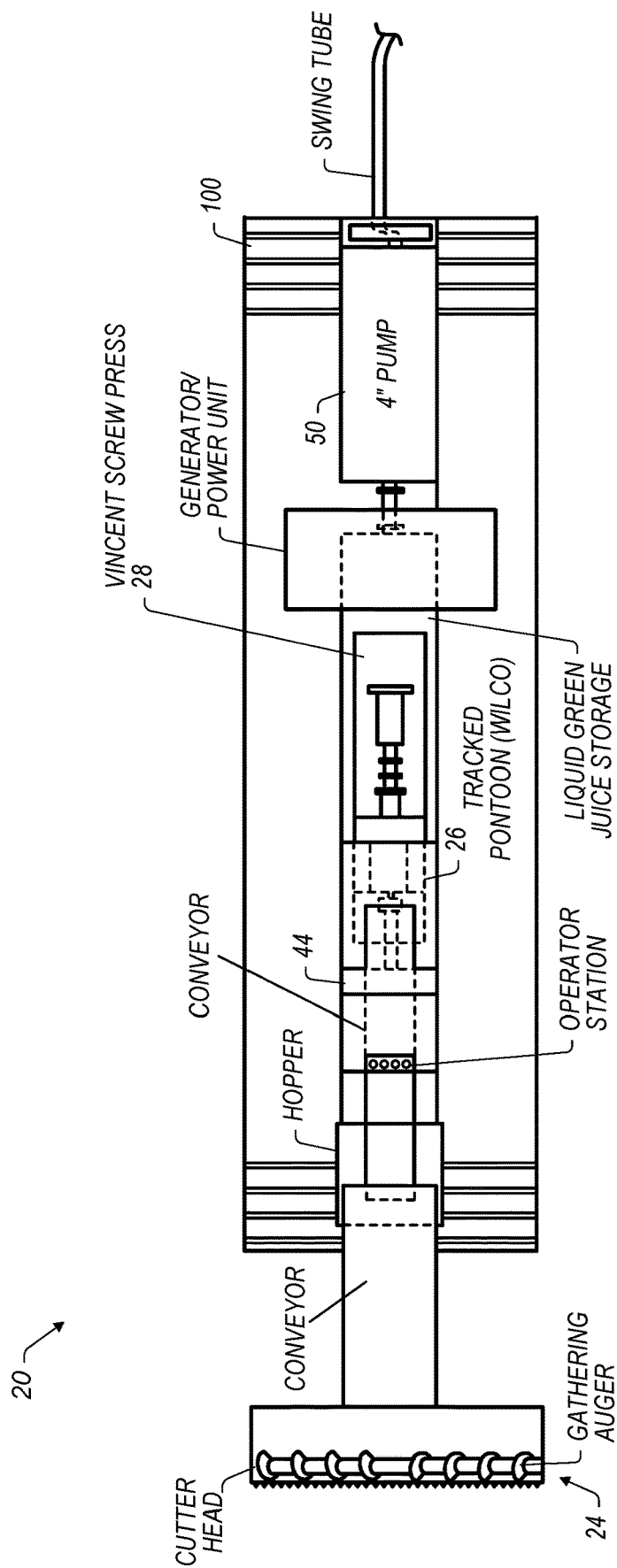
FIG. 2 is a schematic top view diagram of the aquatic vegetation harvesting system of FIG. 1.
Figure 3:
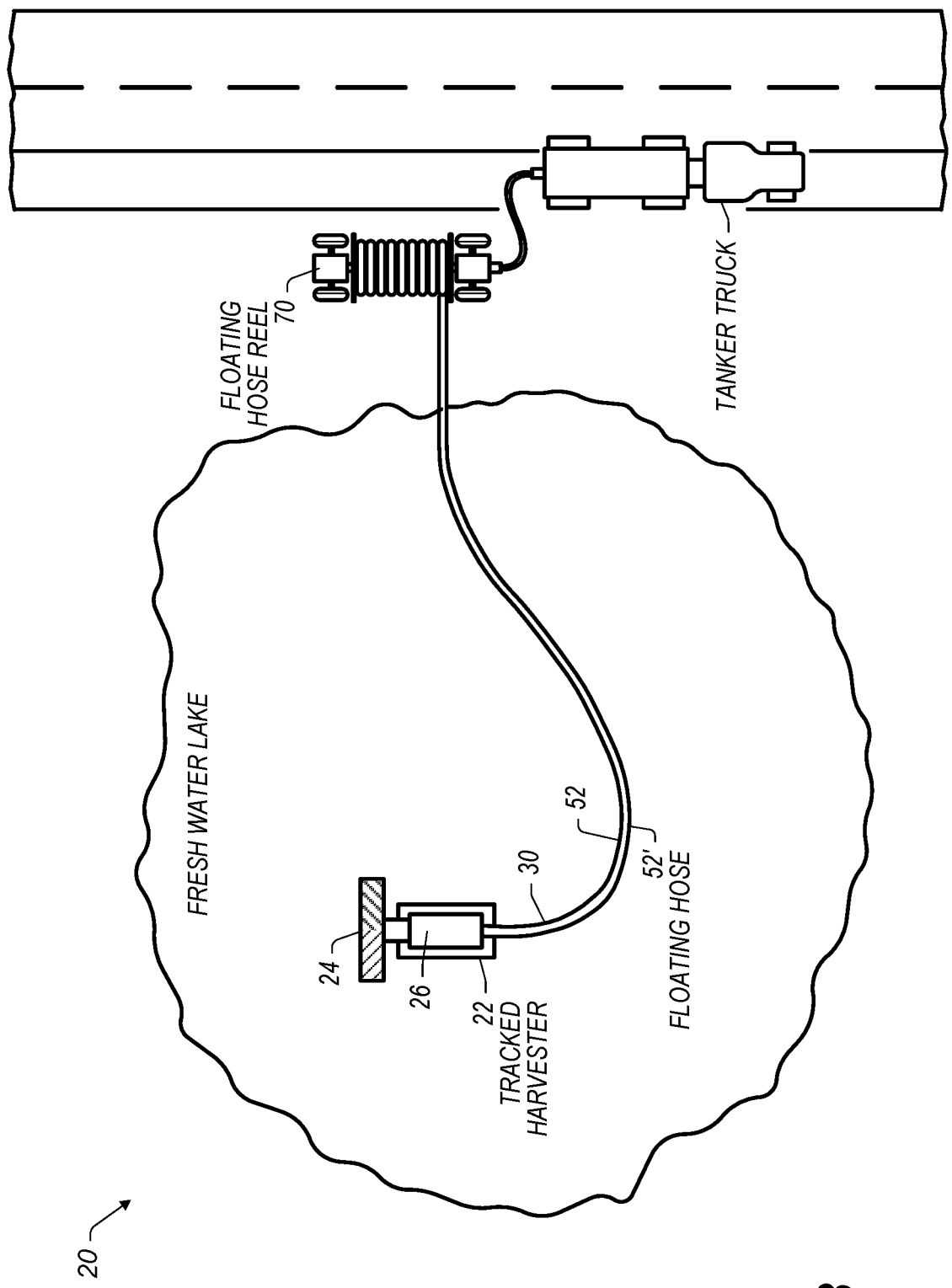
FIG. 3 is a schematic top view diagram of the aquatic vegetation harvesting system of FIG. 1 showing a possible orientation on a body of water relative to a shore.

An aquatic vegetation harvesting system 20 is shown and described in FIGS. 1-6. As best shown in FIGS. 1 and 2, the harvesting system 20 includes a water-based vehicle 22, which is preferably a tracked, floating vehicle that operates equally well in shallow and deep water, with a vegetation cutting system 24, grinding system 26, liquefying system 28 and vegetation transmitting system 30 operably secured thereto. The preferred vehicle 22 and each of these systems are discussed in detail below.

Floating Tracked Vehicle

Figure 15:
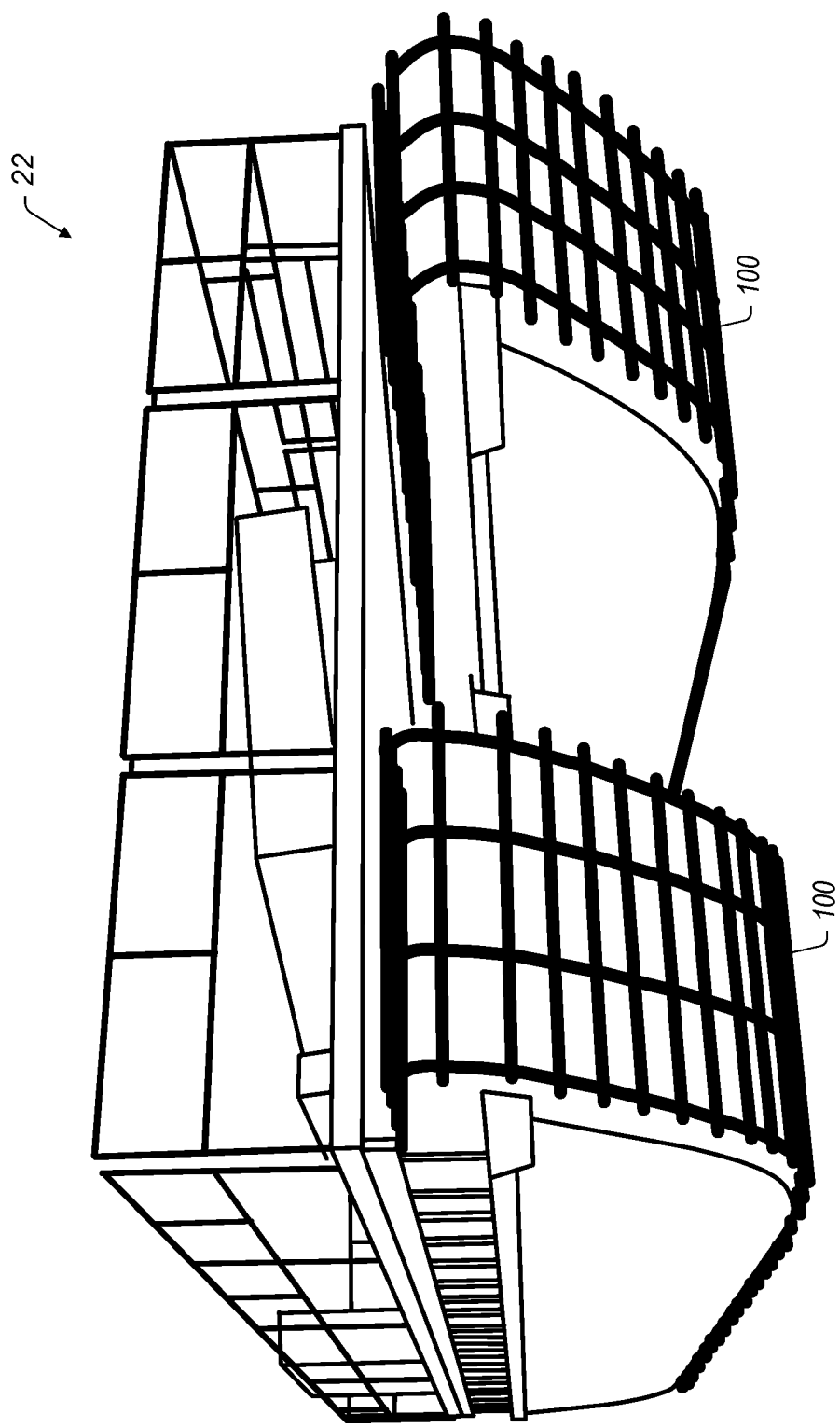
FIG. 15 depicts an embodiment of a tracked floating vehicle.
Figure 16:
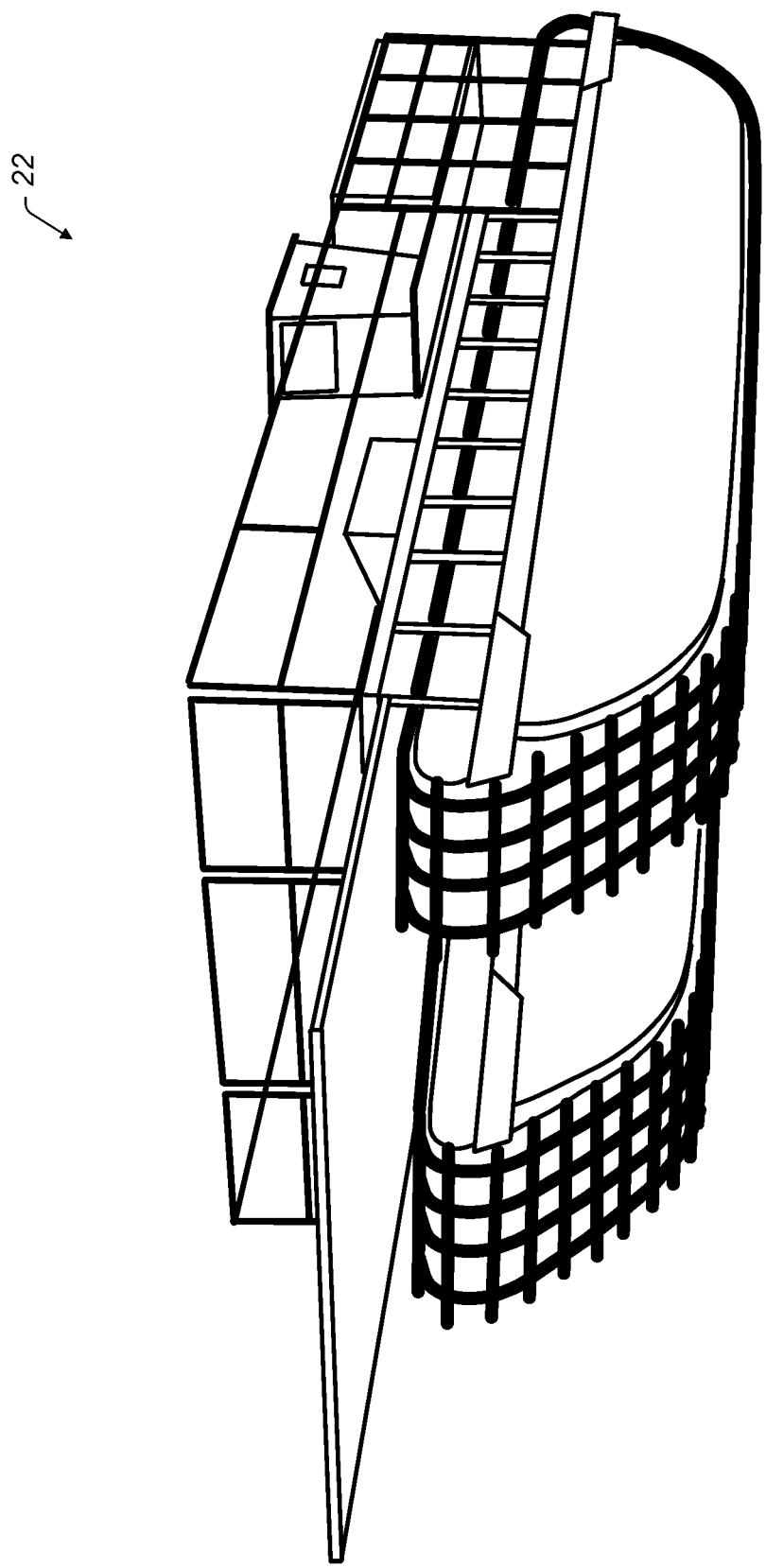
FIG. 16 depicts an alternate embodiment of a tracked floating vehicle.

Preferably, the system includes a floating tracked vehicle 22 such as shown in FIGS. 15-16. This allows the system to operate in shallow water by the vehicle operating on its tracks and in deep water with the vehicle floating. A floating vehicle known as the "Wilson Marsh Buggy" that is used to transport equipment, materials and personnel through shallow water, swamps and marshes can be adapted to serve as the vehicle for this system. Alternatively, in some situations, the vehicle may be a conventional floating barge as shown in FIGS. 1-2.

Cutting System

As shown in FIGS. 1 and 2, the cutting system 24 can include a conventional cross auger 40 and a cutter head 42 extending from the vehicle to operably engage the vegetation to be cut. A conveyor 44 can transmit the cut vegetation up and onto the vehicle 22 for further processing.

Grinding & Liquefying Systems

The cut vegetation is preferably further processed on board the vehicle 22 with a grinding system 26 operably secured to receive the cut vegetation from the conveyor 44 and transfer finely ground vegetation to the liquefying system 28.

Figure 17:
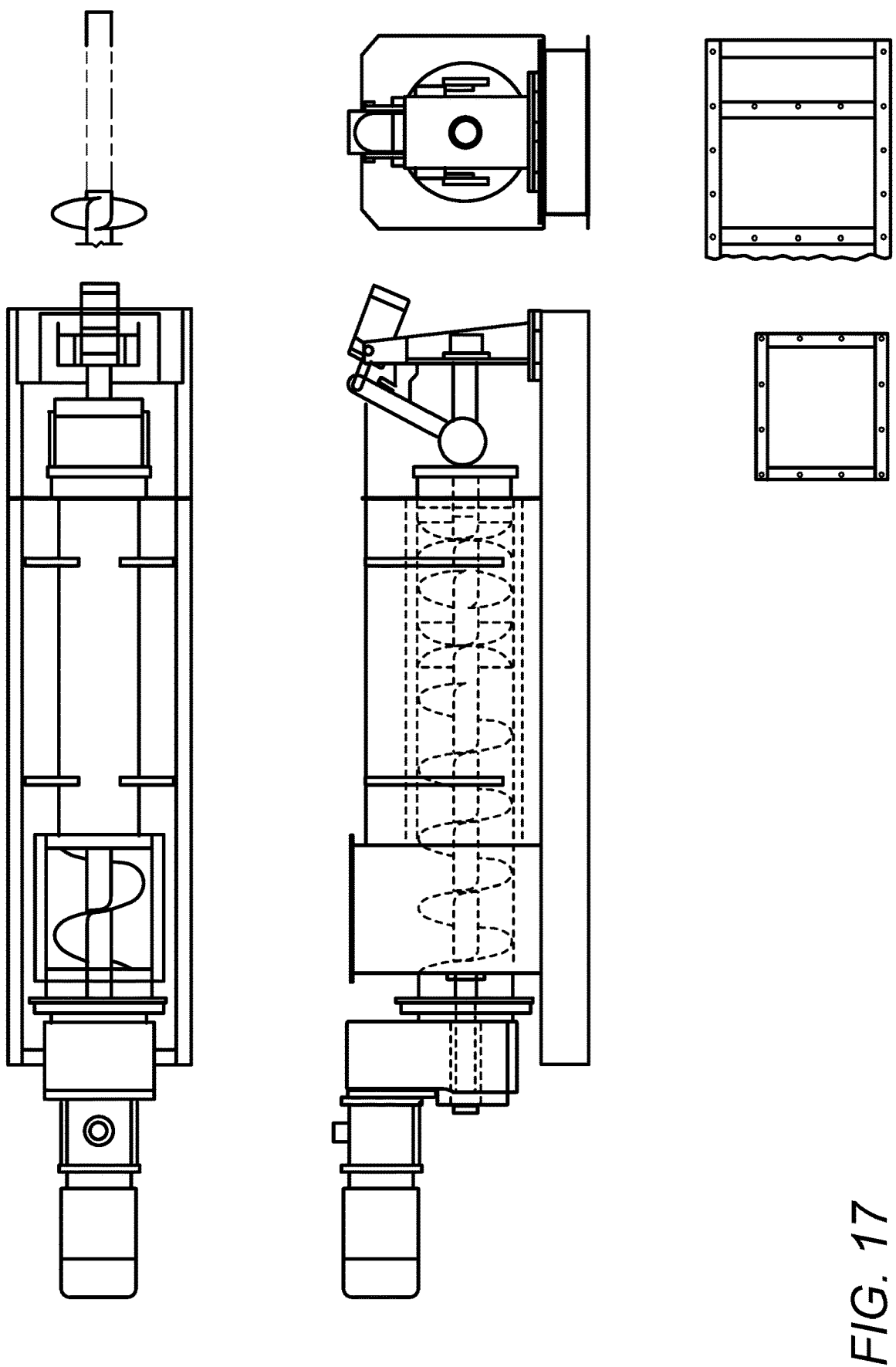
FIG. 17 depicts a schematic diagram of a press.

The liquefying system 28 is preferably an industrial "Screw Press" which takes vegetation and turns it into a liquefied state for easy pumping/transportation to shore. Once liquefied, the product is sent to the transmitting system. One possible preferred screw press is one currently manufactured in Tampa, Fla. and called the "Vincent Screw Press. This type of press may work particularly well for this purpose. Additional information regarding the preferred screw press is provided in FIG. 17.

The grinder known as a "Muffin Monster Grinder" will also operate well in this environment. The grinder is preferably mounted onto the screw press. The purpose of the grinder is to increase throughput and more importantly protect the screw press from foreign material that may cause damage. The grinder is designed to handle any material that may be found in the waterways including wood, plastic and the like.

Transmitting System

Figure 4:
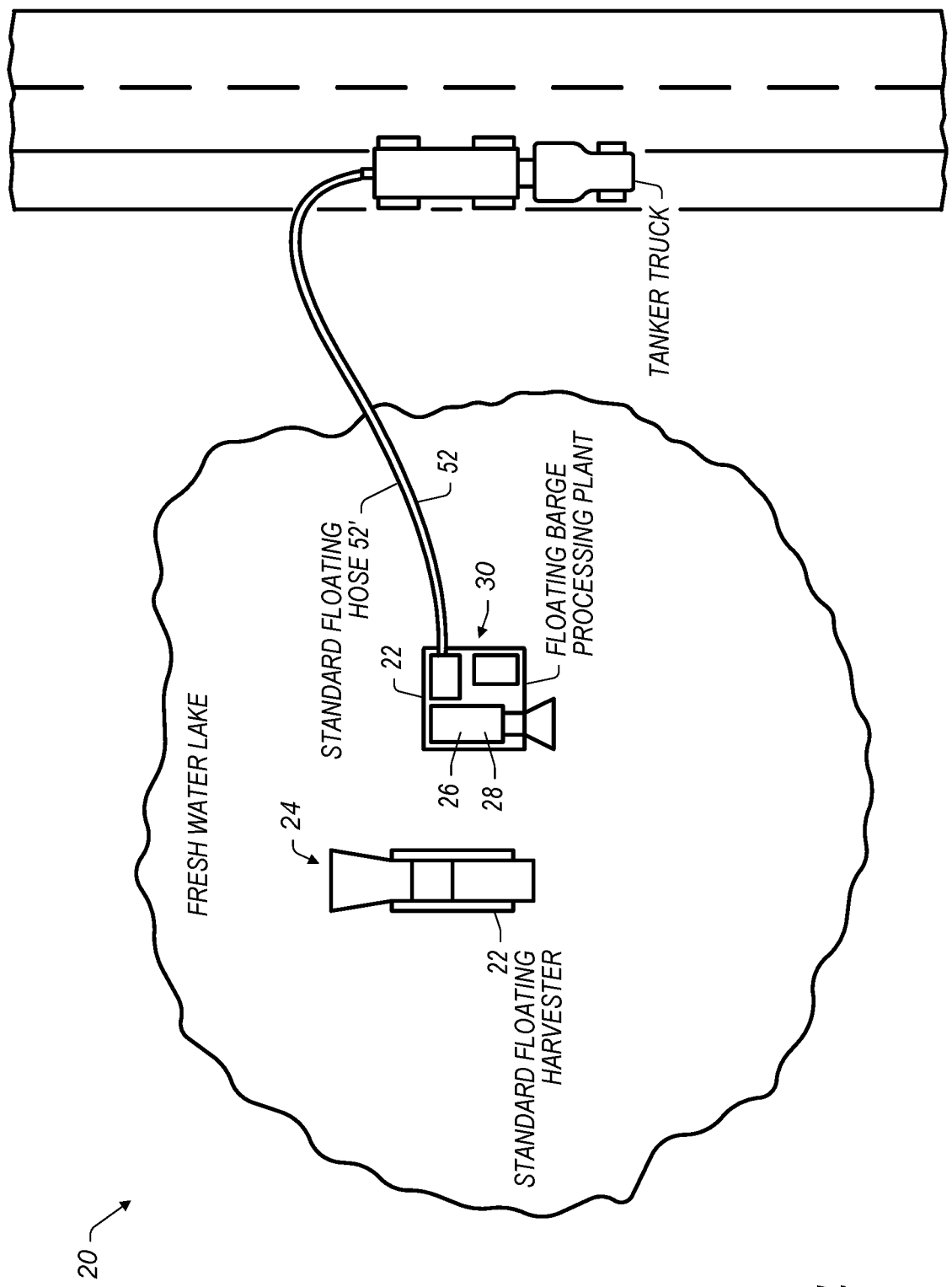
FIG. 4 is a schematic top view diagram of an alternative possible vegetation harvesting system of FIG. 1 showing a possible floating barge for processing vegetation for transporting the processed vegetation to shore.
Figure 5:
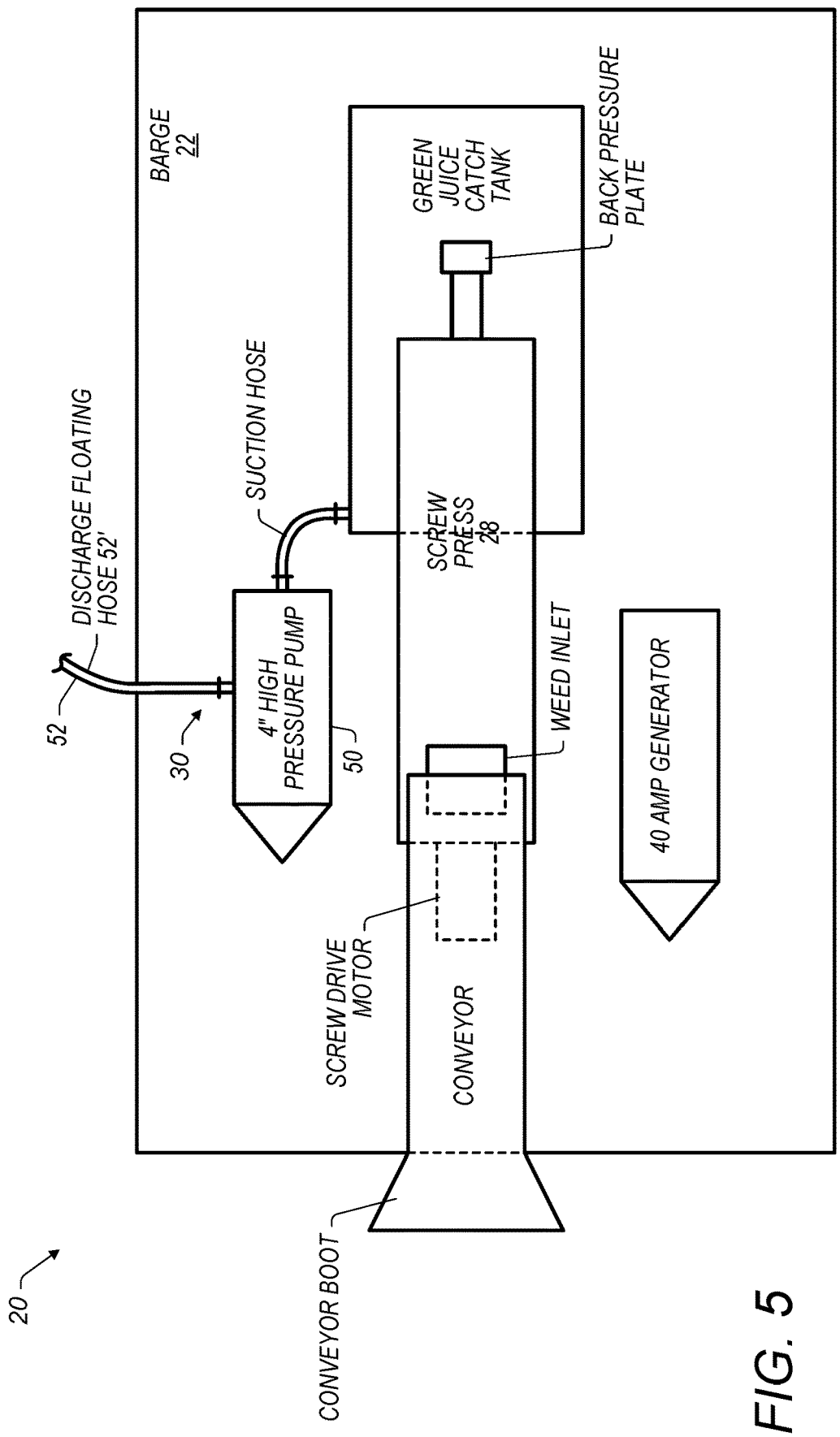
FIG. 5 is schematic top view diagram of the floating processing barge of FIG. 4.

Finely ground vegetation is transmitted to the shore with a transmitting system 30 operably secured to the vehicle. Preferably, the system includes a pump 50 and a discharge hose 52, which is preferably a floating tube 52', extending from the vehicle 22 to the shore 60 as shown in FIGS. 4 and 5, or alternatively to a storage barge. A swing tube is preferably operably secured to the vehicle 22 to move the discharge hose 52 and ensure it is out of the way when the vehicle 22 turns around or backs up. The swing tube is preferably located at the back of the vehicle 22. A generator 62, powers pump 50 and the other components of the system 20.

Figure 6:
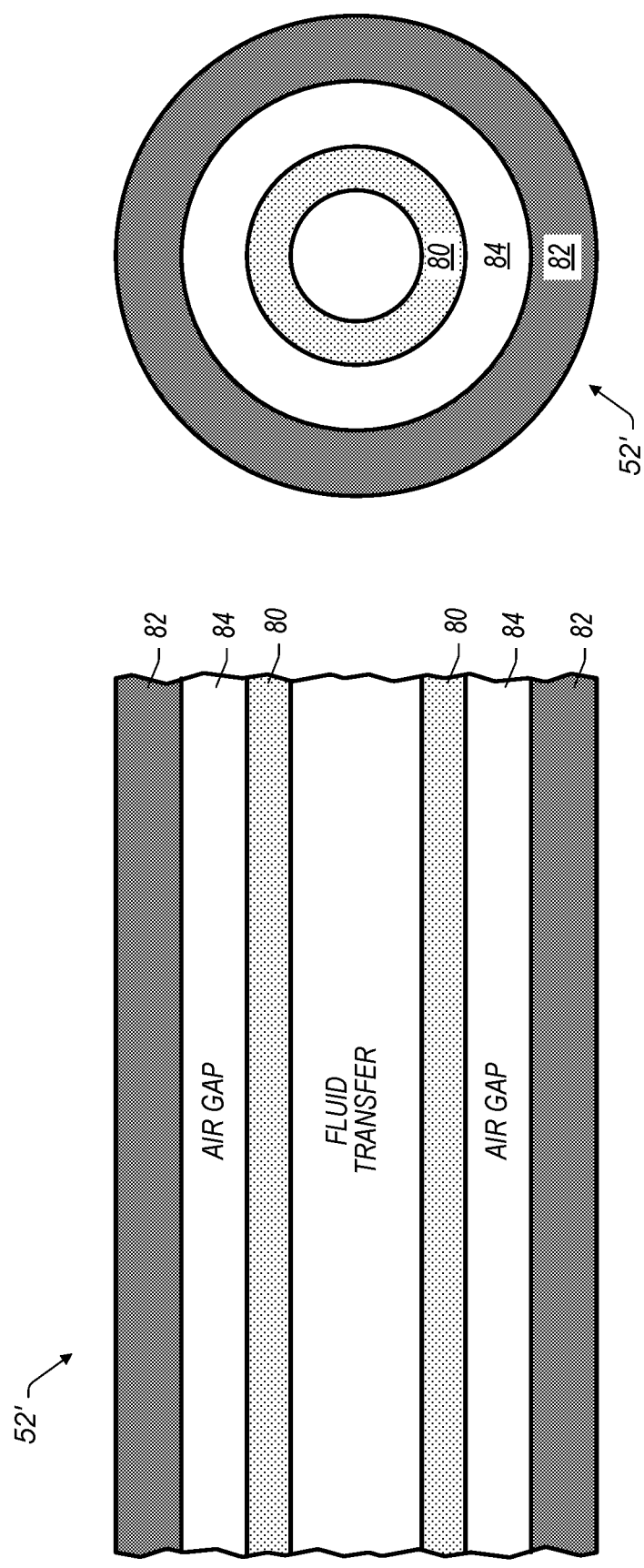
FIG. 6 is a cross-sectional view of a possible floating tube used to transport processed vegetation to shore in accordance with an embodiment of the present invention.
Figure 18:
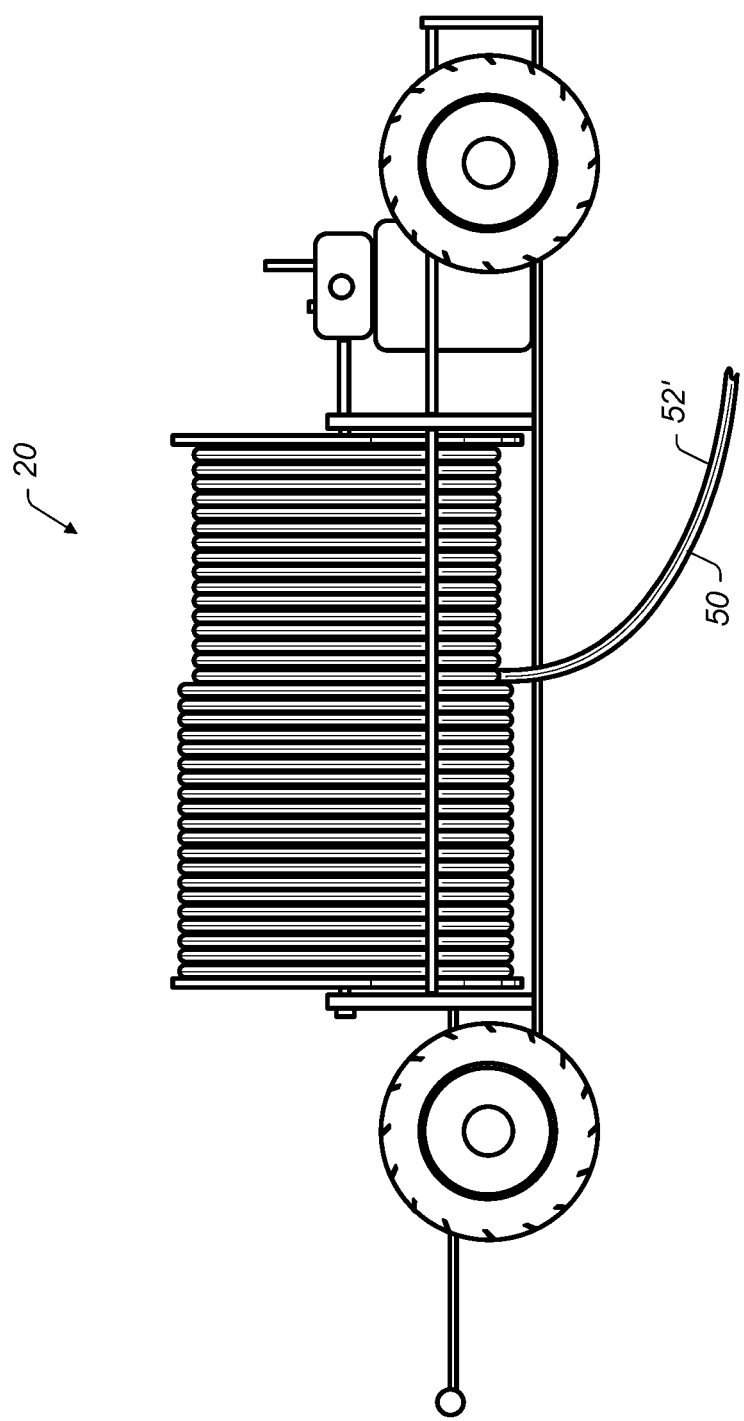
FIG. 18 depicts an embodiment of a hose reel.
Figure 19:
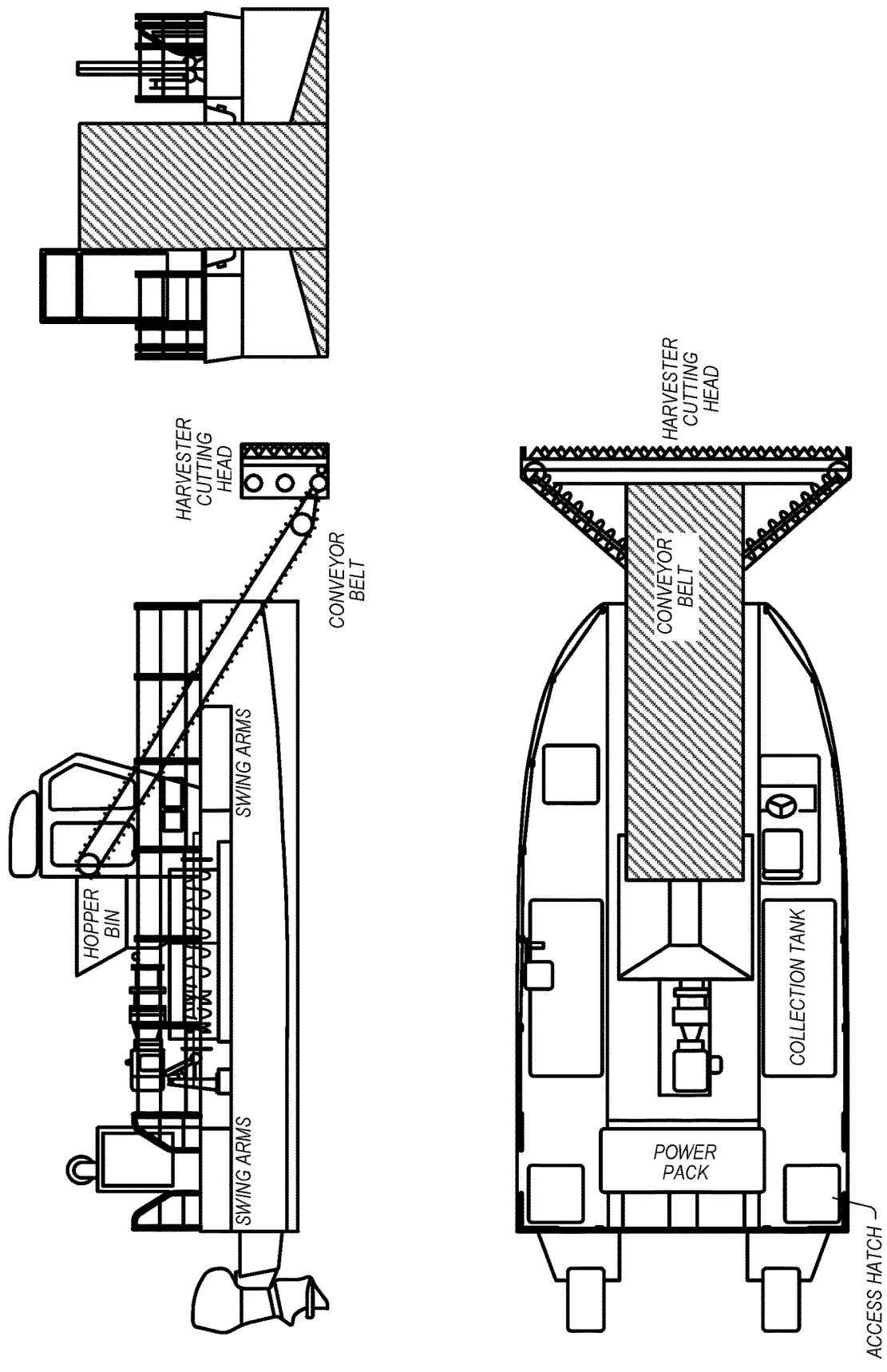
FIG. 19 depicts an embodiment of a powered platform.
Figure 20:
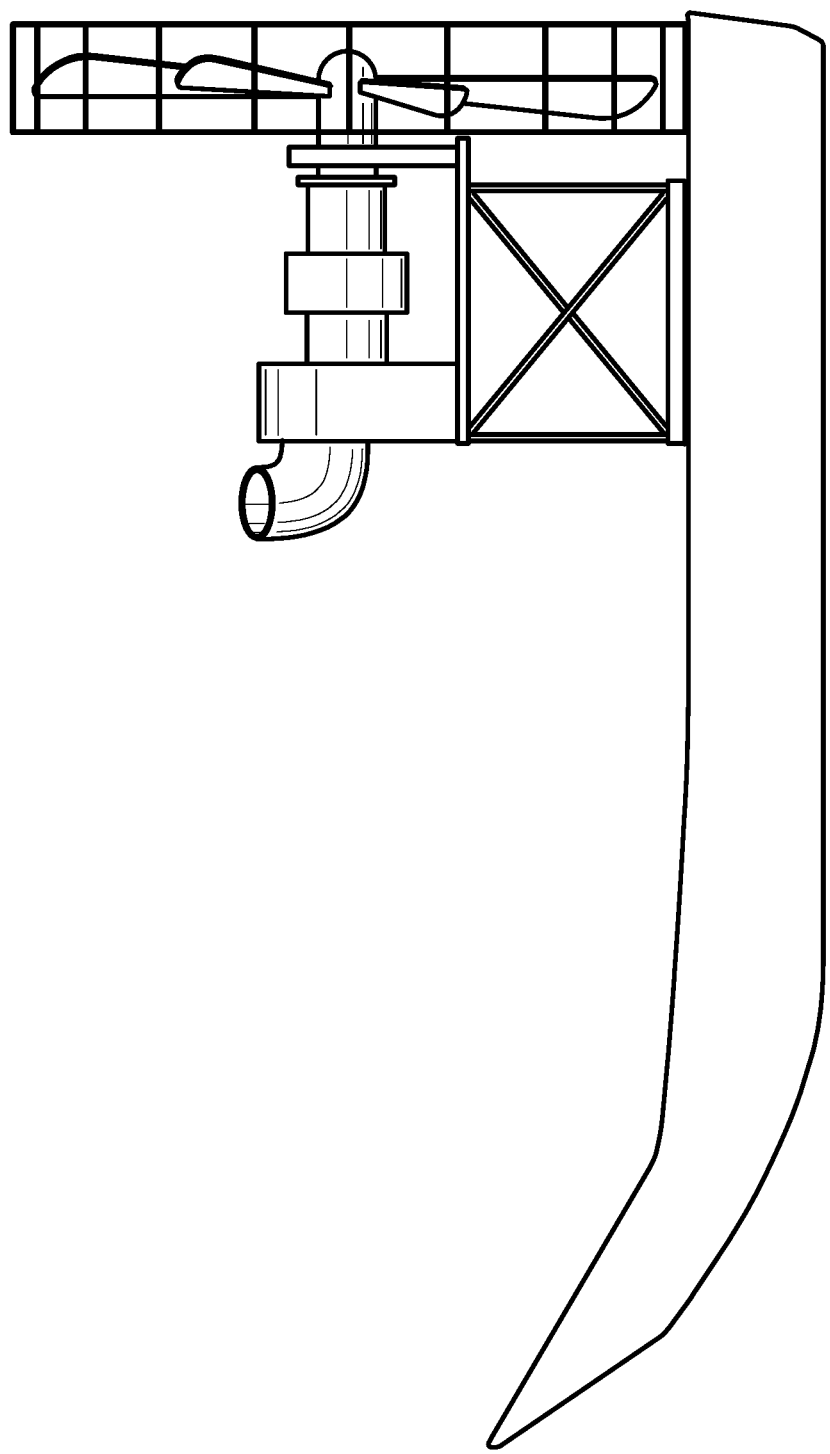
FIG. 20 depicts an embodiment of a propulsion system.

More preferably, the floating tube 52' has the ability to roll onto a reel 70 while pumping as shown in FIG. 18. A conventional high pressure hose will not float effectively without attachment of buoys. Referring to FIG. 6, the preferred tube 52 remains buoyant by positioning an inner tube 80 within a larger cross-sectional area larger tube 82 as shown. The finely ground vegetation is transmitted through the inner tube 80, while the gap 84 between the inner and outer tubes contains air or other gas, thereby allowing the tube 52 to float without the need for buoys. This is important as efficiency is critical in reducing the costs to the Water Management Agencies, thereby reducing the amounts of poisonous herbicides from our drinking water. The "self-floating" hose allows for fast deployment, redeployment and retrieval. Plus, with the ability to add or decrease air pressure within the air-chamber of the hose, we can raise or lower the depth of the hose to where it lays on the waterway bed, or any distance from the bed to floating on the surface. This is critical as we can adjust the hose if and whenever it becomes a navigational hazard without stopping the harvest production.

An exemplary tube 52' construction found to work particularly well includes placing a smaller diameter hose inside a standard 5.5 inch diameter hose resulting in an effective air gap between the two hoses. By sealing the air inside the gap, the hose will float even when the inner hose is filled with finely ground liquefied aquatic vegetation.

Referring to FIG. 18, the Continuous Manure Application Reel 90 (CMA REEL) allows the hose to be easily rolled in and out as necessary, can include a booster pump to pump finely ground and liquefied vegetation to shore, can sit on its own barge, and can provide its own diesel power or the like to run the booster pump, reel and drive system as needed.

Once pumped to shore, the finely ground and liquefied vegetation can be loaded into tanker trucks or the like for transport.

Exemplary Use and Operation

The currently available aquatic vegetation harvesting system 20 is designed to go in waters that are minimally 24" to 36" deep. When current harvesters enter shallower waters, they get stuck in the muddy bottom of the lake—swamp. This creates a large problem for State agencies, as an example, Florida has the Florida Everglades that need massive harvesting and current designed equipment cannot service that body of water due to it being a shallow water swamp.

By installing tracks 100 on a standard aquatic weed harvester we now can do both shallow waters as well as deep waters with the same machine, as shown in FIGS. 15-16.

Secondly, by definition, "harvesting" of aquatic weeds requires the removal of said weeds to shore. Our design can also transport the harvested weeds to the on-shore drop off location. This harvesting system can cut, collect and haul weeds to shore.

Moreover, controlling laws may require the removal of the weeds as they contain high concentration of nutrients, such as phosphorus and nitrogen. For example, the Florida Fish and Wildlife department correctly state that this is the main culprit in algae outbreaks and further aquatic weed proliferation.

The challenge with the current models of aquatic weed harvester is time and hence, expense required to haul the harvested weeds to shore. This makes mechanical harvesting expensive and less viable as the aquatic weeds need to be hauled long distances across a body of water.

To make the process more time effective, and hence, significantly more affordable, our invention includes "liquefying" the aquatic weeds on the harvester itself or on a barge close by. Once weeds are liquefied through the use of a "screw press", they are pumped through a floating hose to shore where the liquids are then hauled away. It is predicted our new system will be sufficiently more efficient due to the time saving issues on not having to transport the weeds to shore.

In the event we are only harvesting in deep water, a standard aquatic weed harvester can be used. In this case, our "system of liquefaction" of the weeds would be close by on a floating barge.

The standard harvester would harvest a load of weeds and turn around and deliver the harvested weeds to the floating barge which would be only be a few yards from the harvester so the turnaround time to off load weeds is fast. A water-taxi system is another extant system that can be used unload the harvester while still harvesting and transport said load to the barge for processing, losing zero production time. The barge would receive the harvested weeds via a conveyor, then liquefied and pumped to shore through a floating hose and trucked away by tanker trucks.

In the event the floating hose is not an option (waterway navigational hazard, distance), we will use liquid tanks on floating barges (and/or the tanks themselves can be floatable) to receive the liquefied plants. Once the tanks are full, they would be hauled and/or floated to shore.

The purpose of this design is to have a hose-in-a-hose system that can have liquid being pumped through the inside hose and float. The hose we will be using is the same hard hose used on hose reels for irrigation systems. The key difference is our new design has a smaller hose on the inside of the existing hose. The smaller hose will be used to pump the liquid and the larger outer hose to hold the air pressure for buoyancy.

It is particularly useful that we are able to continuously pump liquid from the harvester to shore. This way we never have to stop harvesting in a given area. This hose system would have a reach of approximately 2,500 feet (half a mile) from the hose reel. Therefore, our system can harvest a large area before we would have to stop harvesting and reset up. The State of Florida currently spends 20 million dollars on chemicals poisons to battle the proliferation of the noxious aquatic weed Hydrilla alone. The Fish and Wildlife officials have said that currently using chemicals to battle Hydrilla and other aquatic weeds is their only viable option at this time. Our invention will challenge that, thereby removing many thousands of metric tons of poisons from our daily drinking water.

Articulated Tracked Vehicle

Figure 7:
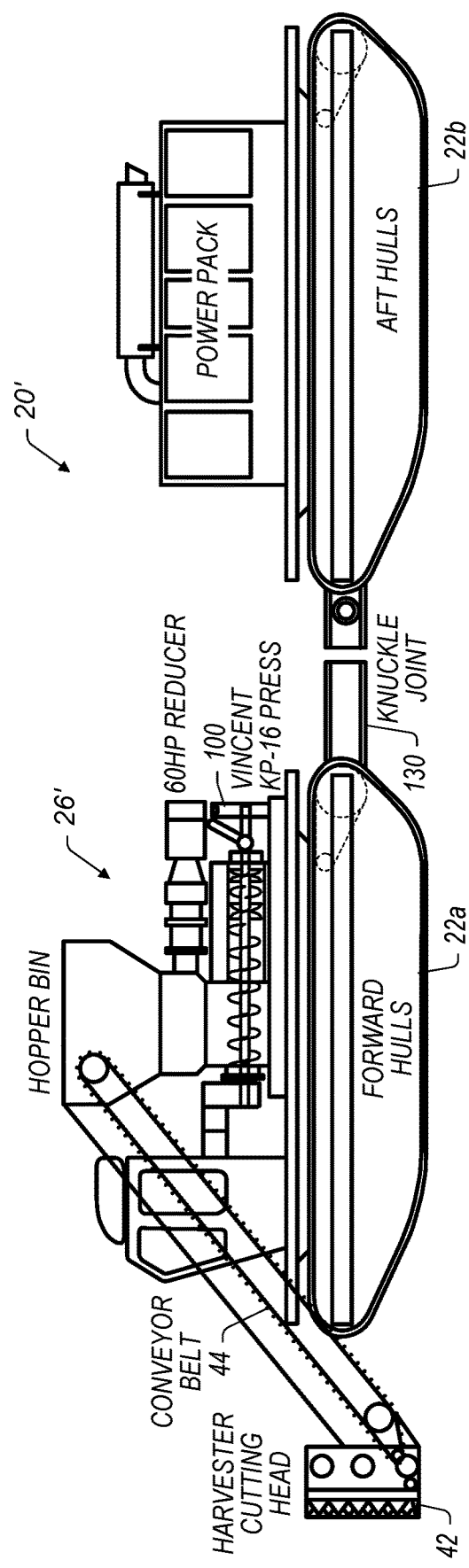
FIG. 7 is a side schematic view of an alternative possible vegetation harvesting system having a possible articulated floating tracked vehicle with a pivoting joint positioned between two floating tracked sections.
Figure 8:
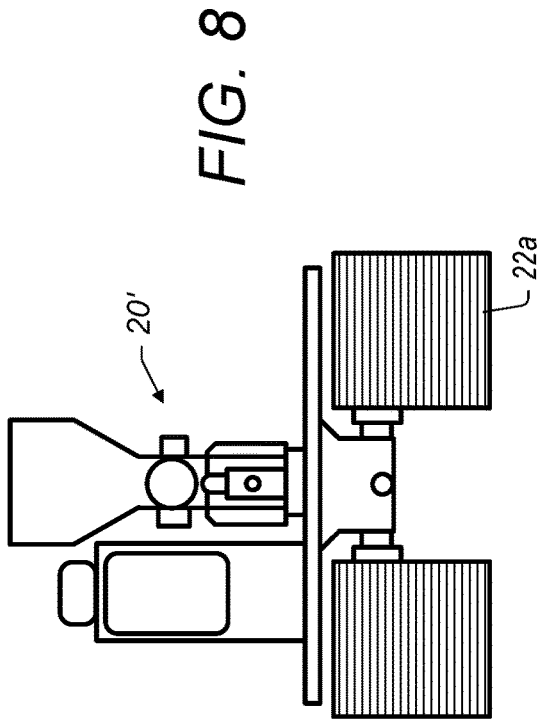
FIG. 8 is a front view of the alternative possible vegetation harvesting system of FIG. 7.
Figure 9:
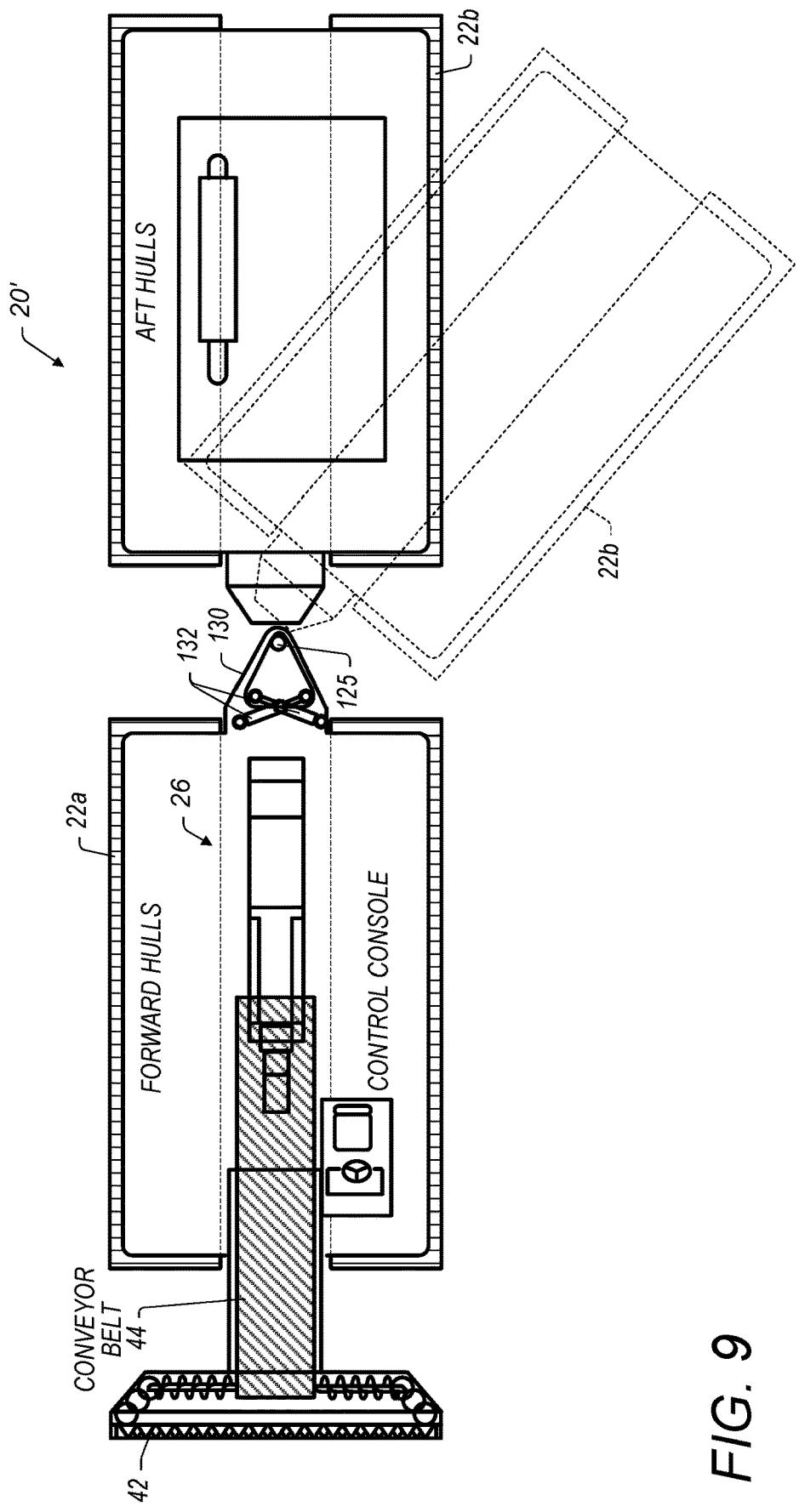
FIG. 9 is a top view of the alternative possible vegetation harvesting system of FIG. 7.

Referring to FIGS. 7-1'l, an alternative tracked vehicle 20' is disclosed. In order to minimize undue repetition, like elements between the disclosed embodiments are like numbered. The alternative tracked vehicle 20' of this embodiment includes a forward floating tracked vehicle 22a and an aft floating tracked vehicle 22b joined together at a pivot point 125, preferably with a knuckle joint 130. This allows the forward and aft floating tacked vehicles 22a, 22b (respectively) to pivot with respect to each other about the pivot point 125.

Preferably, hydraulic cylinders 132 in communication with a control system (not shown) operably engage the forward and aft floating tracked vehicles 22a, 22b (respectively) to allow the pivot position to between the two floating tracked vehicles to be selected by an operator. Accordingly, the vehicle 20' may be steered by the operator operating the onboard propulsion systems on one or both vehicles 22a, 22b and selecting a desired pivot angle between the forward and aft floating tracked vehicles 22a, 22b.

Harvesting equipment may be mounted to either the forward or the aft floating tracked vehicles as desired. In FIG. 7, one possible orientation of equipment is shown with the processing equipment mounted to the forward tracked vehicle and the power pack mounted to the aft tracked vehicle. Additional harvesting equipment may also be mounted to one or the other of the tracked vehicle as needed.

Referring to FIG. 10, a preferred press 100 known as a Vincent IKP16 press is shown. Referring to FIG. 11, a preferred reducer 102 arrangement is shown.

Floating Watercraft Vehicle

Referring to FIGS. 12-14, an alternative vehicle 20' for carrying the vegetation harvesting equipment is disclosed. In order to minimize undue repetition, like elements between the disclosed embodiments are like numbered. The alternative vehicle 20' of this embodiment includes a trackless floating watercraft such as a boat 300 or the like.

The trackless floating watercraft can include a wide lower surface and a shallow hull for allowing the watercraft to float in shallow water even when heavily loaded with harvesting equipment. A propulsion system such as one or more outboard motors 302 and the like can be mounted to the watercraft. Harvested biomass may be stored in a collection tank 304 mounted within the hull of the watercraft.

Harvesting equipment may be mounted to either the forward or the aft floating tracked vehicles as desired. In FIG. 12, one possible orientation of equipment is shown with the processing equipment mounted to the forward tracked vehicle and the power pack mounted to the aft tracked vehicle. Additional harvesting equipment may also be mounted to one or the other of the tracked vehicle as needed.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An aquatic vegetation harvesting system comprising:
   a movable floatable platform;
   a vegetation cutting system coupled to the movable floatable platform and positionable in water when the aquatic vegetation harvesting system is positioned in a body of water;
   a grinding system positioned on the movable floatable platform and coupled to the vegetation cutting system, wherein the grinding system receives aquatic vegetation from the vegetation cutting system and produces ground vegetation from the harvested aquatic vegetation;
   a liquefying system positioned on the movable floatable platform and coupled to the grinding system, wherein the liquefying system receives ground vegetation from the grinding system and produces at least partially liquefied vegetation; and
   a transmitting system coupled to the movable floatable platform, wherein the transmitting system comprises a pump coupled to the liquefying system and a flexible discharge hose coupled to the pump, wherein the flexible discharge hose is a floating hose, and wherein the flexible discharge hose comprises a flexible inner tube within a larger cross-sectional area flexible outer tube, wherein an annular gap is formed between the inner tube and the outer tube, and wherein the annular gap is sealable to contain a gas.

2. The system of claim 1, wherein the movable floatable platform is a tracked floating vehicle.

3. The system of claim 1, wherein aquatic vegetation in the body of water is cut by the vegetation cutting system and transferred to the grinding system with a conveyor.

4. The system of claim 1, wherein the grinding system is capable of grinding wood and plastic captured by the vegetation cutting system.

5. The system of claim 1, wherein the grinding system is mounted onto the liquefying system.

6. The system of claim 1, wherein the liquefying system comprises a screw press.

7. The system of claim 1, wherein the discharge hose is configured to allow air to be added or removed from the annular gap.

8. The system of claim 1, wherein the grinding system is positioned on the movable floatable platform such that the ground vegetation produced from the harvested aquatic vegetation is contained on the movable floatable platform.

9. A method of removing aquatic vegetation from a body of water comprising:
   cutting aquatic vegetation in the body of water using a vegetation cutting system disposed on a moveable floatable platform disposed in the body of water;
   transporting the cut aquatic vegetation to a grinding system disposed on the moveable floating platform;
   grinding the aquatic vegetation in the grinding system to produce ground aquatic vegetation;
   transporting the ground aquatic vegetation to a liquefying system;
   producing at least partially liquefied vegetation in the liquefying system
   pumping the at least partially liquified vegetation to a location remote from the moveable floating platform through a transmitting system coupled to the movable floatable platform, wherein the transmitting system comprises a pump coupled to the liquefying system and a flexible discharge hose coupled to the pump, wherein the flexible discharge hose is a floating hose, and wherein the flexible discharge hose comprises a flexible inner tube within a larger cross-sectional area flexible outer tube, wherein an annular gap is formed between the inner tube and the outer tube, and wherein the annular gap is sealable to contain a gas.

10. The method of claim 9, wherein the remote location in on a shore of the body of water.

11. The method of claim 9, wherein the remote location is a floating barge located proximate to the movable floatable platform.

* * * * *